(12) United States Patent
Inskeep et al.

(10) Patent No.: US 11,114,869 B2
(45) Date of Patent: Sep. 7, 2021

(54) JUMP STARTER AUTO SAFETY JUMPER MODULE

(71) Applicant: VECTOR PRODUCTS, INC., Boca Raton, FL (US)

(72) Inventors: Mathew Inskeep, Highland Beach, FL (US); Henry Shum, Boca Raton, FL (US)

(73) Assignee: VECTOR PRODUCTS, INC., Boca Raton, FL (US)

( * ) Notice: Subject to any disclaimer, the term of this patent is extended or adjusted under 35 U.S.C. 154(b) by 0 days.

(21) Appl. No.: 16/371,998

(22) Filed: Apr. 1, 2019

(65) Prior Publication Data

US 2019/0229544 A1 Jul. 25, 2019

Related U.S. Application Data

(63) Continuation-in-part of application No. 15/015,786, filed on Feb. 4, 2016, now abandoned.

(60) Provisional application No. 62/112,934, filed on Feb. 6, 2015.

(51) Int. Cl.
*H02J 7/00* (2006.01)
*H01R 11/24* (2006.01)
*H02J 1/10* (2006.01)
*H02J 7/14* (2006.01)
*H02J 7/34* (2006.01)

(52) U.S. Cl.
CPC ............ *H02J 7/0034* (2013.01); *H01R 11/24* (2013.01); *H02J 1/10* (2013.01); *H02J 7/1461* (2013.01); *H02J 7/34* (2013.01); *H02J 7/342* (2020.01); *H02J 1/122* (2020.01)

(58) Field of Classification Search
CPC ...................................... H02J 7/0034
See application file for complete search history.

(56) References Cited

U.S. PATENT DOCUMENTS 5,833,493 A * 11/1998 Hung ..................... H01R 11/00
439/504
7,656,118 B2 * 2/2010 Krieger ................. H02J 7/0034
320/105

* cited by examiner

*Primary Examiner* — Hai L Nguyen
(74) *Attorney, Agent, or Firm* — Daniel S. Polley, P.A.

(57) ABSTRACT

An auto safety jumper module to prevent accidental short circuits or wrong connections between a jump start system and a motor vehicle battery when jump starting such motor vehicle. The module can be fully automatic and capable of detecting when a motor vehicle battery is connected to it. The module, which can be integrated into or an external add-on to a jump start system, does not need an external sensing wire(s) to detect when alligator clamps of the jump start system are connected to a vehicle battery post or to detect when the alligator clamps are disconnected.

20 Claims, 3 Drawing Sheets

JUMP STARTER AUTO SAFETY JUMPER MODULE

This application is a continuation-in-part of U.S. application Ser. No. 15/015,768, filed Feb. 4, 2016, which claims priority to and the benefit of U.S. Provisional Application Ser. No. 62/112,934, filed on Feb. 6, 2015, the disclosures of all above-identified applications are incorporated by reference herein in their entireties for all purposes.

1. FIELD OF THE DISCLOSURE

The disclosure relates generally to automobile jump starters and particularly to safety components for portable jump starters.

2. BACKGROUND

Motor vehicles require an initial jolt of electric current to start their engine. This jolt of current is delivered by the battery of the motor vehicle. At times, due to environmental conditions or other unexpected depletion scenarios, the on-board battery loses its energy and is unable to deliver sufficient energy to start an engine. Because of this condition, a temporary alternative energy source is required. This alternative source is known in the automotive industry as a jump-starting system. When an automotive vehicle has a discharged depleted battery, a conventional jump-starting system provides the particular vehicle with a quick jolt of electric current required to start the engine via cables and alligator clamps. Other conventional jump-starting systems may not contain a battery, but instead are made up of straight jumper cables with alligator clamps. The jumper cables operate by connecting a vehicle with a discharged battery directly in parallel with the battery of a fully operating vehicle battery. One downside of a conventional jump-starting system or jumper cables is that they may or may not include a safety switch. The safety switch basically prevents the energy from flowing from one battery to the other. This safety switch is a protection against accidental 'wrong connections.' A wrong connection occurs when the dead battery and the good battery are connected with opposite polarities. For example, the positive of the good battery is connected to the negative of the dead battery, or vice versa. This is a dangerous scenario that may cause an explosion and possible harm to user(s). Because of this danger, many jump-starting systems include a safety switch in their systems and even use color coded jumper cables and clamps to properly identify the proper battery polarity. However, even with visual indications and a safety switch, improper connections may still occur. The present disclosure described a novel devices to directed to overcoming the above shortcomings of conventional jump-starting systems and provides an opportunity to improve these currently existing systems.

SUMMARY OF THE DISCLOSURE

The disclosed novel device is preferably for the automotive field, particularly, jump starting systems, and more particularly, for portable jump-starting systems with power safety devices The disclosed device is a jump-starting system safety device. Specifically, the device is an auto safety jumper module. With the disclosed novel device, when an automotive vehicle battery is deeply discharged and in need of a jump start, the energy from a jump start system's battery or from another vehicle's battery system will be safely delivered to the discharged vehicle battery using a built-in or external add-on auto safety jumper module. The auto safety jumper module behaves as an ON/OFF switch, except it can be preferably controlled by an internal microprocessor and instead of mechanical parts, the switch action can be preferably achieved using solid state devices. This means the electric current flows through a semiconductor doping material instead of mechanical parts in a preferred embodiment. Additionally, no intervention from the user will be required since the operating switch action is automatic, unlike a manual safety switch(es).

Typically, a jump start system consists of an internal battery connected to a safety power switch and a pair of cables with alligator clamps for connection to a vehicle's battery posts. The internal battery and safety switch of the jump start system are enclosed in a portable container with the cables and clamps externally exposed. The disclosed novel device significantly diverges from or improves on prior systems by automatically detecting an improper connection and preventing the flow of electric current between the jump start system and the vehicle's battery system until a proper connection is made. Further, the disclosed novel device also supersedes prior devices that require a sensing wire(s) on the clamp(s) to detect when a vehicle battery is connected or disconnected, as disclosed in U.S. Pat. Nos. 7,656,118 and 8,376,775.

The disclosed novel device provides for a safer way to interface a jump start system and a vehicle battery system by auto activation and de-activation.

The disclosed novel device initially detects if a jump starting system is properly connected to a discharged battery, which will prevent accidental shorts or wrong connections. Determining if the battery is connected properly can be the first task to be completed. This can be preferably accomplished by comparing the voltage of the jump start system containing the good battery with the voltage of the vehicle's battery system containing the depleted battery. During this process, the microprocessor compares the voltage inputs it receives from the two systems. If the voltages of the two systems match, the auto safety module will be initiated by powering its electronic controls inside via a solid state device(s), known as MOSFET, used as an electrical ON/OFF switch. If the microprocessor determines that the voltages of the two systems do not match, the MOSFET is not activated.

The disclosed device detects that a good connection exists between the systems and, if so, will then allow energy to flow freely, overcoming the downside earlier described above of a possible explosion occurring. The energy will flow from the good system battery through the auto safety jumper module, to the pair of cables with alligator clamps and into the depleted battery.

The disclosed device is an auto safety jumper module. More specifically, it is a module to prevent accidental short circuits or wrong connections between a jump start system and a motor vehicle battery when jump starting such motor vehicle. The module is fully automatic and capable of detecting when a motor vehicle battery is connected to it. Unlike other methods of detecting when a jump start system's alligator clamps are connected to a vehicle's battery system, the module, which can be integrated into or an external add-on to a jump start system, does not need an external sensing wire(s) to detect when alligator clamps of the jump start system are connected to a vehicle battery post or to detect when the alligator clamps are disconnected.

DETAILED DESCRIPTION

The disclosed device provides for a better and safer way to transfer energy between two electrical systems, such as a jump start system and a vehicle battery system, though such is not considered limiting. The novel auto safety module can be built-in to a jump start system (FIG. 2) or can be externally added-on (FIG. 1) to jump start cables that are connected to an electrical system with a good source of energy. The auto safety jumper module will only allow the transfer of energy when a proper electrical connection exists between the two systems, meaning that the positive terminal of the first system's battery is connected to the positive terminal of the second system's battery and the negative terminal of the first system's battery is connected to the negative terminal of the second system's battery.

Figure 1:
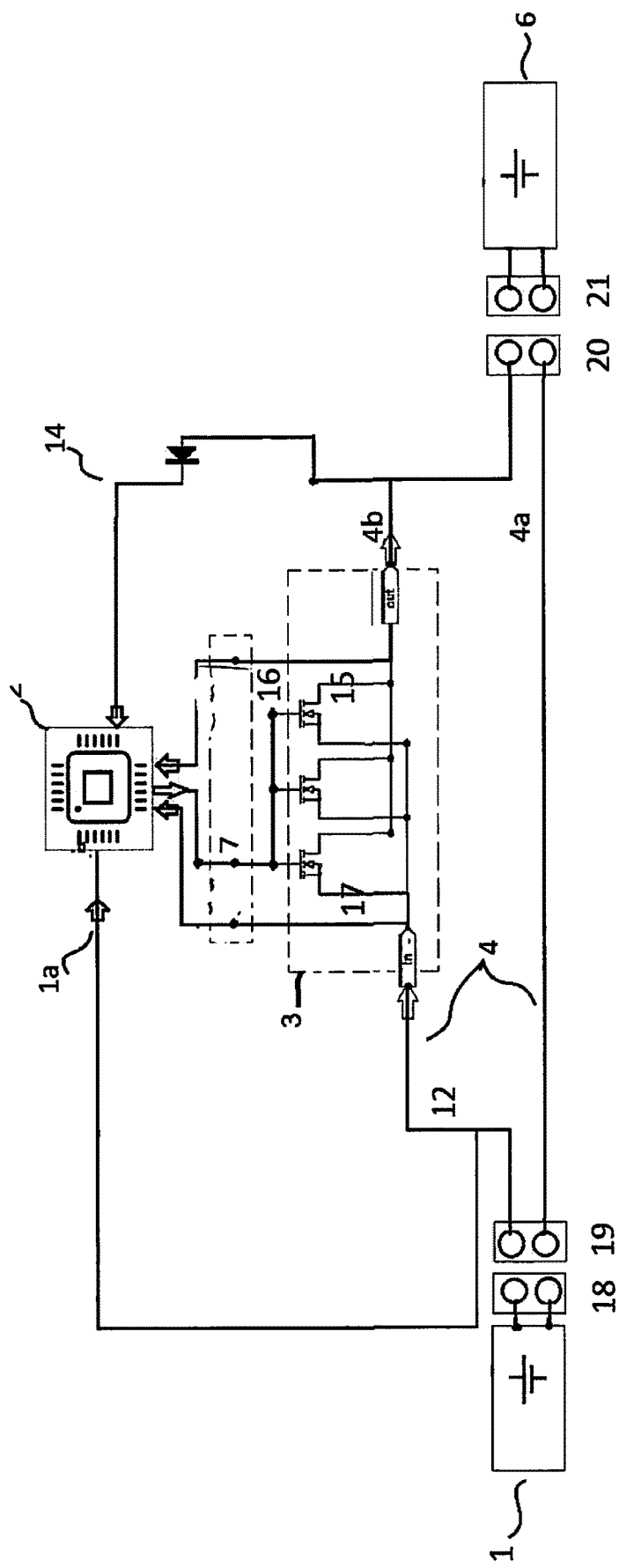
FIG. 1 is a non-limiting representation of the jump start auto safety module adapted for external connection to a jump starter system in accordance with the present disclosure.

FIG. 1 illustrates the functionality and essential elements of an auto safety module as used with a jump-starting system to jump start a depleted battery. The complete system and invention can be preferably made up of four components.

The first is a good source of energy, which typically will come from a charged battery, which we refer to as a good battery 1, such as a battery integrated into the jump start system itself or a vehicle's electrical system in which the battery is charged and not depleted. The good battery 1 typically can be an automotive battery, of any chemistry. However, the use of the auto safety module in a jump start system or as an external add on to jump start cables is not limited to an automotive battery; and it can be used with any other type of energy source, provided that is compatible with the depleted system and preferably has greater than six-volt potential.

The second is a programmable device, preferably a microprocessor 2. The microprocessor 2 is an active component and functions as the brains of the invention. Microprocessor 2 receives input signals of the depleted battery's 6 voltage and the good battery's 1 voltage and stores them as variables in an internal volatile memory segment. Microprocessor 2 monitors any changes in the incoming signals in real time and can be constantly updating.

Third can be a device to control the flow of electric current MOSFET 3. A MOSFET is a three-pin device, with a gate, a channel source to drain. It can be considered for the disclosed novel module as an ON/OFF power switch capable of high current delivery when turned ON. Preferably, there are no mechanical parts. In an alternative embodiment, multiple MOSFET 3 can be electrically connected to form a higher electrical capacity auto safety jumper module.

The fourth component is a set of transmission lines 4 to safely carry the energy between the electrical systems of the jump starter and the vehicle. The set of good transmission lines 4 can be preferably comprised of two conductor cables; one will be a ground conductor 4a and one will be a positive conductor 4b. The transmission lines 4 each have clamps, which can be alligator clamps or the like, on the end of the cables. By connecting the clamps to the good battery posts 18 and the depleted battery posts 21, the electrical system of the good battery 1 is connected to the electrical system of the depleted battery 6. Specifically, the clamps connected to the depleted battery 6 are referred to as the output clamps 20 and the clamps connected to the good battery 1 are referred to as the input clamps 19. Initially, the good battery 1 will provide the energy needed to power the microprocessor 2 via a wire 1a. The microprocessor 2 actively monitors input signals and changes it receives from the good battery 1 and the depleted battery 6. The main function of the microprocessor 2 is to process the input signals and either power ON and OFF the auto safety jumper module via MOSFET 3, which controls the flow of electric current between the good battery 1 and the depleted battery 6. One of the active signals the microprocessor 2 processes is the changes in voltage of the good battery 1, via wire 1a. The second input processed by the microprocessor 2 is a reverse polarity input.

A reverse polarity condition exists when two voltage potentials are inversely connected to one another. For clarity, a reverse polarity condition can also be described as when one of the transmission lines 4 is connected to the opposite potential to that of the opposite system. The microprocessor detects the voltage signal from the depleted battery 6 and determines a reverse polarity exists via the reverse connection wire 14. If the incoming voltage signal is added to the voltage of the good battery 1, the microprocessor 2 determines whether a reverse polarity condition exists, and if so it will not engage the MOSFET 3, meaning that the MOSFET 3 will remain in an infinite open state condition until the correct signal is received by the microprocessor 2 from the reverse connection wire 14. As a non-limiting example, when the output battery clamps are connected in reverse to the depleted battery, the voltage is read by the microprocessor as a negative value i.e. −10. This voltage is added to the good battery voltage i.e. 13V. When they are added by the microprocessor the difference in this case 3 V, is not normal, to be lower than good battery, so is determine the output clamps were connected in reverse If no reverse polarity exists there is a good connection. A good connection exists when there is no added input voltage received at via the reverse connection wire 14. As previously stated, the microcontroller 2 is continuously checking for any changes to the input and adjusting decisions accordingly.

Once it is determined that a reverse polarity condition does not exist and there is a good connection, the microprocessor 2 powers ON the auto safety jumper module via the MOSFET 3. The microprocessor 2 bias (activates) the MOSFET gate pin 7 leading to the gate input 16 of the MOSFET and gradually begins to increase the voltage. The resistance to turn on is inversely proportional to the voltage; so, as the voltage is increased, the resistance is decreased, allowing the MOSFET to begin opening and allowing current to flow via transmission lines 4. The microprocessor 2 actively monitors for any energy flow from drain 15 to source 17. If no change in current is detected, it is processed by the microprocessor 2 that no connection exists between the system of the good battery 1 and the system of the depleted battery 6, and the microprocessor will continue monitoring for any change in energy before allowing the bulk of the current to flow. If a good connection is detected and a flow of current is detected, the microprocessor 2 processes this data as a good and safe connection between the systems and starts increasing the MOSFET gate voltage 16 of the MOSFET 3 until it is fully ON. When MOSFET 3 is fully ON, the highest energy flow is allowed.

Figure 2:
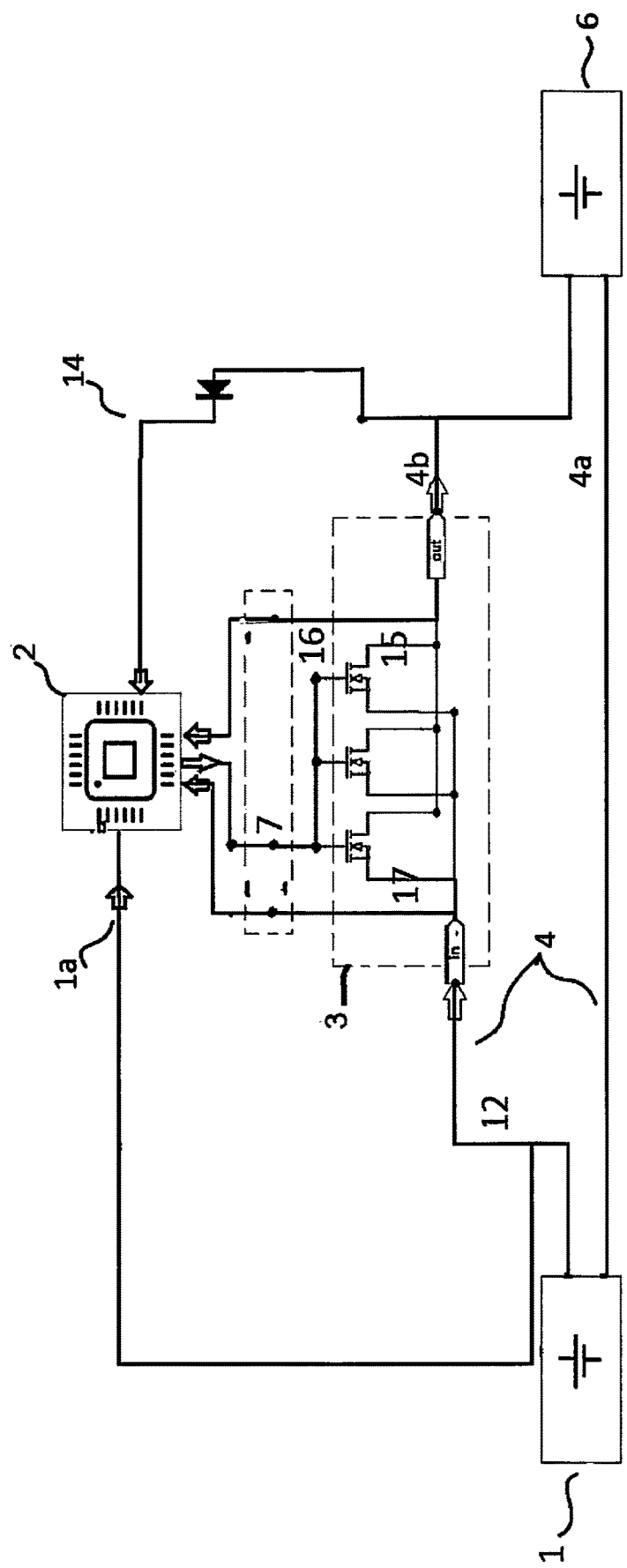
FIG. 2 is a non-limiting representation of the jump start auto safety module integrated as a part of a larger system in accordance with the present disclosure.

As seen in FIG. 2, terminal blocks 18, 19, 20 and 21 are removed to reflect the novel module preferably being integrated in this non-limiting embodiment as an internal component, such that the transmission lines can be directly connected. Accordingly, the preferred novel solid-state, high-energy safety power switch, having smart controls or programmed instructions or programmed controls, can be an integrated as an internal component of a larger system as a power supply. The connection between the source and the depleted system in this embodiment of the novel safety power module can be integrated and hardwired as part of a larger system and provide for a direct connection.

Figure 3:
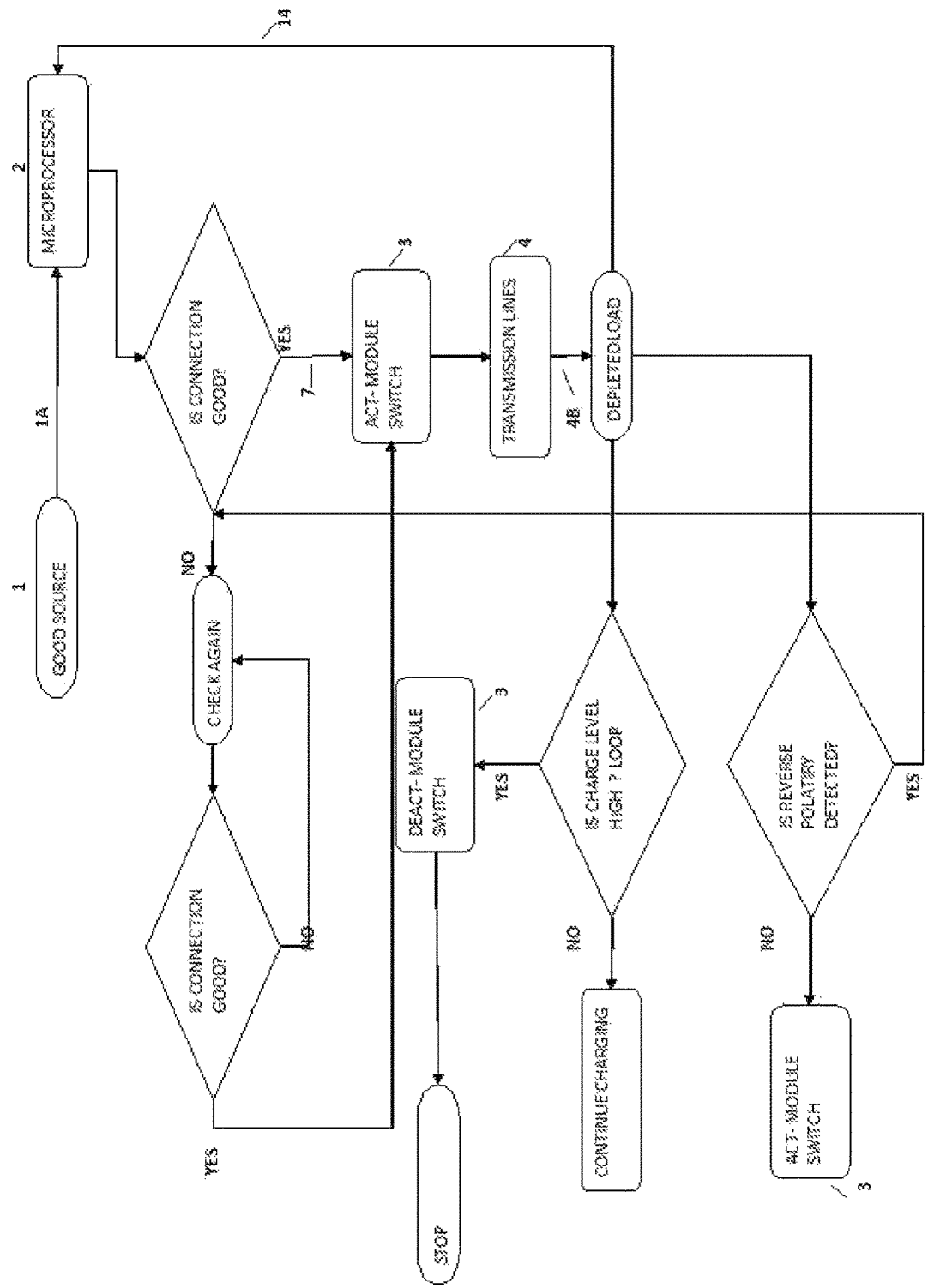
FIG. 3 is flowchart of the smart control algorithm in accordance with the present disclosure.

FIG. 3 shows the programmed steps for the smart control. The smart control feature can preferably be an algorithm programming code that is embedded into the microprocessor, that makes the module safe and can be either integrated or built-in as an external component. FIG. 3 provides a high-level functional diagram for one embodiment of the software. In the preferred embodiment, the smart controls can be an algorithm working in conjunction with the signals received by the microprocessor to detect safety parameters before activating the power switch module and preferably only activates when a good connection is detected. It will deactivate upon disconnection. Further, it will not be active when a reverse polarity is detected.

Thus, in summary, an auto safety jumper module in the form of a solid state high energy safety power switch with smart controls for aiding in preventing accidental short circuits or wrong connection between a jump start system and a battery of a motor vehicle when jump starting the motor vehicle can be provided. The auto safety jumper module is in electrical communication with the jump start system. The jump start system can be in electrical communication with an energy source. The module can comprise:

at least one solid state device& which are electronically configured to act as a power switch with high current capabilities to either permit or prevent electric current flow between the energy source and the battery of the motor vehicle depending on whether the at least one solid state device is in an open position or a closed position;

digital controls which are programmed with a time sequence and duty cycle for energizing and de-energizing of two systems, the digital controls sending control signals to the at least one solid state device; and a matching polarity detector wherein the multiple solid-state devices are controlled by the digital controls that prevent energy transfer between the two systems until the said matching polarity detector signals the digital controls that proper polarity is achieved between the electrical connection of the energy source to the battery of the motor vehicle.

The multiple solid-state devices can be at least one MOSFET. The digital controls can be micro-controllers or microprocessors. The matching polarity detector can be a DC electrical system with positive and negative potentials. The digital controls can actively monitor an increase or decrease to the Vgs voltage to determine the status of the two systems. The Vgs voltage can be set to a predetermined reference voltage of 100 mV. A time sequence can delay activating the energy transfer until proper connection is engaged between all internal solid-state devices as determined by the digital controls. The solid-state high energy safety power switch with smart controls or embedded smart control programming instructions/software can be integrated as an internal component of a larger system, as a power supply. The solid state high energy safety power switch with smart controls or embedded smart control programming instructions/software can be an external component that can be adapted for external and direct connection to the portable jump start system.

A method is also disclosed for aiding in preventing accidental short circuits or wrong connections between a jump start system and a battery of a motor vehicle when jump starting the motor vehicle. The method steps can comprise:

a. providing a jump start system associated with an energy source and having a pair of electrical cables and associated clamps electrically connected to the energy source;

b. providing an auto safety jumper module in electrical communication with the jump start system;

c. automatically detecting by the safety jumper module when a motor vehicle battery is electrically connected to the jump start system through connection of the electrical clamps to electrical terminals on the battery of the motor vehicle;

d. automatically determining whether the electrical connection detected in step b. is a proper electrical connection between the jump start system and the battery of the motor vehicle or an improper electrical connection between the jump start system and the battery of the motor vehicle; and e. automatically preventing electric current to flow from the jump start system to the battery of the motor vehicle where an improper electrical connection is determined in step c. or automatically allowing electric current to flow from the jump start system to the battery of the motor vehicle where a proper electrical connection is determined.

The above-mentioned step e can comprise the steps of:

e1. obtaining a voltage for the jump start system;

e2. obtaining a voltage for the battery of the motor vehicle;

e3. determining whether a reverse polarity connection condition exist based on the voltage obtained in step d1 and the voltage obtained in step d2.

A proper electrical connection preferably consists of a positive terminal of an energy source associated with the portable jump start system being electrically connected to a positive terminal of the battery of the motor vehicle and a negative terminal of the energy source being electrically connected to the negative terminal of the battery of the motor vehicle. A reverse polarity connection condition preferably consists of a positive terminal of the energy source associated with the portable jump start system being electrically connected to a negative terminal of the battery of the motor vehicle and a negative terminal of the energy source being electrically connected to the positive terminal of the battery of the motor vehicle.

The disclosed novel auto safety jumper module can be preferably used in connection with a portable jump start system for automatically aiding in preventing short circuit or wrong connections between the jump start system and a battery of a motor vehicle when jump starting the motor vehicle with the jump start system. The auto safety jumper module can be in electrical communication with the portable jump start system and the portable jump start system can be associated with an energy source. The portable jump start system can have a first conductor cable electrically associated with the energy source and can have a first clamp at an outer end and a second conductor cable electrically associated with the energy source and can have a second clamp at an outer end. The first and second conductor cables can carry energy between the energy source associated with the portable jump start system and the battery of the motor vehicle. The disclosed module can comprise:

- means for automatically detecting whether an improper or proper electrical connection exists between the jump start system and the battery of the motor vehicle after the jump start system has been electrically connected to the battery of the motor vehicle; and
- means for automatically preventing any flow of electric current between the jump start system and the battery of the motor vehicle where an improper electrical connection is detected or allowing electric current to flow from the jump start system to the battery of the motor vehicle where a proper electrical connection is detected.

In one non-limiting embodiment, the means for automatically detecting and the means for preventing can comprise:

- a microprocessor programmed to receive input signals from the battery of the motor vehicle regarding a current voltage of the battery and a current voltage of the energy source associated with the JSS;
- a volatile memory segment in communication with the microprocessor for storing the input signals received from the microprocessor for later use by the microprocessor;
- wherein the microprocessor programmed to automatically monitor in real time for any changes either of the input signals and to constantly update and store any changes determined; and
- at least one MOSFET acting as an electrical on/off switch connected within the first conductor cable and positioned either in an "open" position or "closed" position based on signals received from the microprocessor to control the flow of electric current between the energy source and the battery of the motor vehicle.

The means for automatically detecting and means for automatically preventing can be contained within the portable jump start system. The means for automatically detecting and means for automatically preventing can be adapted to be electrically connected to a pair of cables of the portable jump start system.

As mentioned above, a proper electrical connection preferably consists of a positive terminal of an energy source associated with the portable jump start system being electrically connected to a positive terminal of the battery of the motor vehicle and a negative terminal of the energy source being electrically connected to the negative terminal of the battery of the motor vehicle. The energy source can be a battery preferably having at least a 6V potential. The microprocessor can be adapted to be powered by the energy source and can be programmed to detect and process changes in a voltage of the energy source.

The microprocessor can be preferably programmed to detect when a reverse polarity condition exists between electrical connection of the energy source and the battery of motor vehicle caused by voltage potentials of the energy source and the battery of the motor vehicle being inversely connected to one another. The microprocessor can be preferably programmed to cause the MOSFET to be in an "open" position when the microprocessor determines that a reverse polarity condition does not exist. In the "open" position current can be allowed through the conductor cables between the energy source and the battery of the motor vehicle.

Some or all of the above-described components or parts, such as, without limitation, those described for the modules, can be contained within a housing or portable housing, or can be connected to such housing.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described device/system and their locations, electronic communication methods between the system components, wiring, attachment or securement mechanisms, dimensions, values, shapes, materials, sensors, monitoring methods, etc. discussed above or shown in the drawings, if any, are merely by way of example and are not considered limiting and other component(s) and their locations, electronic communication methods, wiring, attachment or securement mechanisms, dimensions, values, shapes, materials, sensors, monitoring methods, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the claims.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the novel system and method have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An auto safety jumper module in the form of a solid state high energy safety power switch with smart controls for aiding in preventing accidental short circuits or wrong connection between a jump start system and a battery of a motor vehicle when jump starting the motor vehicle, the auto safety jumper module in electrical communication with the jump start system, the jump start system in electrical communication with an energy source, comprising:

at least one solid state MOSFET which is electronically configured to act as a power switch with high current capabilities to either permit or prevent electric current flow between the energy source and the battery of the motor vehicle depending on whether the at least one solid state device is in an open position or a closed position;

a microcontroller or microprocessor programmed to provide control signals to the at least one solid state MOSFET, the microcontroller or microprocessor programmed to determine reverse polarity conditions for an electrical connection between the jump start system and the battery of the motor vehicle, the microcontroller or microprocessor programmed to receive and compare a voltage of the jump start system with a voltage of the motor vehicle battery and where the voltage of the jump start system and the voltage of the motor vehicle battery match the microcontroller or microprocessor is programmed to determine that a reverse polarity condition does not exist and sends a signal to the at least one solid state MOSFET to permit energy transfer between the jump start system and the motor vehicle battery; and wherein the at least one solid-state MOSFET is controlled by the microcontroller or microprocessor to prevent energy transfer between the jump start system and the battery of the motor vehicle until the microcontroller or microprocessor detects that a proper polarity is achieved between the electrical connection of the jump start system to the battery of the motor vehicle wherein the microcontroller or microprocessor is programmed to provide a signal to the at least one solid state MOSFET to allow energy transfer between the jump start system and the battery of the motor vehicle to occur.

2. The auto safety jumper module of claim 1, wherein the microprocessor or microcontroller is programmed to actively monitor an increase or decrease to a Vgs voltage to determine the status of the jump start system and the battery of the motor vehicle.

3. The auto safety jumper module of claim 2, wherein the Vgs voltage is set to a predetermined reference voltage of 100 mV.

4. The auto safety jumper module of claim 1, wherein the microcontroller or microprocessor is programmed to delay sending a signal for the energy transfer until proper connection is engaged between all internal solid-state devices as determined by the microprocessor.

5. The auto safety jumper module of claim 1, wherein the solid-state high energy safety power switch is integrated as an internal component of a larger system, as a power supply.

6. The auto safety jumper module of claim 1, wherein the solid state high energy safety power switch is an external component that is adapted for external and direct connection to the portable jump start system.

7. The auto safety jumper module of claim 1 wherein the jump start system and the motor vehicle are in electrical communication with the microcontroller or microprocessor at the same time.

8. The auto safety jumper module of claim 1 wherein the auto safety jumper module is a separate and independent unit which physically and electrically connects with the jump start system.

9. A method for aiding in preventing accidental short circuits or wrong connections between a jump start system and a battery of a motor vehicle when jump starting the motor vehicle, comprising the steps of:

a. providing the jump start system, the jump start system associated with an energy source and having a pair of electrical cables and associated clamps electrically connected to the energy source;
b. providing an auto safety jumper module in electrical communication with the jump start system, the auto safety jumper module having a microprocessor or microcontroller;
c1. automatically detecting by the safety jumper module when the battery of the motor vehicle is electrically connected to the jump start system through connection of the electrical clamps to electrical terminals on the battery of the motor vehicle;
c2. receiving and comparing a voltage of the jump start system with a voltage of the motor vehicle battery by the microprocessor or microcontroller;
d. automatically determining by the microprocessor or microcontroller whether the electrical connection detected in step c1. is a proper electrical connection between the jump start system and the battery of the motor vehicle or an improper electrical connection between the jump start system and the battery of the motor vehicle; and
e. automatically preventing electric current to flow from the jump start system to the battery of the motor vehicle where an improper electrical connection is determined in step d. or automatically allowing electric current to flow from the jump start system to the battery of the motor vehicle where a proper electrical connection is determined;
wherein the microprocessor or microcontroller determines that the electrical connection detected in step d. is proper when the received voltage of the jump start system and the received voltage of the motor vehicle battery match as determined by the microcontroller or microcontroller.

10. The method auto safety jumper module of claim 9 wherein the proper electrical connection comprises a positive terminal of the energy source associated with the jump start system being electrically connected to a positive terminal of the battery of the motor vehicle and a negative terminal of the energy source being electrically connected to the negative terminal of the battery of the motor vehicle.

11. The method of claim 9 wherein the reverse polarity connection condition comprises a positive terminal of the energy source associated with the jump start system being electrically connected to a negative terminal of the battery of the motor vehicle and a negative terminal of the energy source being electrically connected to the positive terminal of the battery of the motor vehicle.

12. An auto safety jumper module for use in connection with a portable jump start system for automatically aiding in preventing short circuit or wrong connections between the jump start system and a battery of a motor vehicle when jump starting the motor vehicle with the jump start system, the auto safety jumper module being a separate and independent unit from the jump start system which is physically connected to the jump start system.in use, the auto safety jumper module in electrical communication with the portable jump start system during use and the portable jump start system associated with an energy source, the portable jump start system having a first conductor cable electrically associated with the energy source and having a first clamp at an outer end and a second conductor cable electrically associated with the energy source and having a second clamp at an outer, the first and second conductor cables carrying energy between the energy source associated with the portable jump start system and the battery of the motor vehicle, comprising:

means for automatically detecting whether an improper or proper electrical connection exists between the jump start system and the battery of the motor vehicle after the jump start system has been electrically connected to the battery of the motor vehicle; and means for automatically preventing any flow of electric current between the jump start system and the battery of the motor vehicle where the improper electrical connection is detected or allowing electric current to flow from the jump start system to the battery of the motor vehicle where the proper electrical connection is detected;

wherein the means for automatically detecting and the means for preventing comprise:

a microprocessor programmed to simultaneously receive input signals from the battery of the motor vehicle regarding a currently existing voltage of the battery and a currently existing voltage of the energy source associated with the jump starter system, the microprocessor programmed to compare the existing voltage of the battery to the existing voltage of the energy source;

a volatile memory segment in communication with the microprocessor for storing the input signals received from the microprocessor for later use by the microprocessor;

wherein the microprocessor programmed to automatically monitor in real time for any changes either of the input signals and to constantly update and store any changes determined; and at least one MOSFET acting as an electrical on/off switch connected within the first conductor cable and positioned either in an "open" position or "closed" position based on signals received from the microprocessor to control the flow of electric current between the energy source and the battery of the motor vehicle;

wherein the microprocessor programmed to send a signal to the at least one MOSFET to permit the flow of electric current between the energy source and the battery of the motor vehicle when the microprocessor determines that the existing voltage of the battery matches the existing voltage of the energy source.

13. The auto safety jumper module of claim 12 wherein the means for automatically detecting and means for automatically preventing are contained within the portable jump start system.

14. The auto safety jumper module of claim 12 wherein the means for automatically detecting and means for automatically preventing are adapted to be electrically connected to a pair of cables of the portable jump start system.

15. The auto safety jumper module of claim 12 wherein the proper electrical connection consists of a positive terminal of the energy source associated with the portable jump start system being electrically connected to a positive terminal of the battery of the motor vehicle and a negative terminal of the energy source being electrically connected to the negative terminal of the battery of the motor vehicle.

16. The auto safety jumper module of claim 12 wherein the energy source is a battery having at least a 6V potential.

17. The auto safety jumper module of claim 12 wherein the microprocessor is adapted to be powered by the energy source.

18. The auto safety jumper module of claim 12 wherein the microprocessor is programmed to detect and process changes in a voltage of the energy source.

19. The auto safety jumper module of claim 12 wherein the microprocessor is programmed to detect when a reverse polarity condition exists between electrical connection of the energy source and the battery of motor vehicle caused by voltage potentials of the energy source and the battery of the motor vehicle being inversely connected to one another.

20. The auto safety jumper module of claim 19 wherein the microprocessor is programmed to cause the MOSFET to be in an "open" position when the microprocessor determines that a reverse polarity condition does not exist, wherein in the "open" position current is allowed through the conductor cables between the energy source and the battery of the motor vehicle.

\* \* \* \* \*